Feb. 20, 1962 H. L. R. SMYTH ET AL 3,022,418

ELECTRONIC CONTROL CIRCUIT

Filed Sept. 25, 1957 5 Sheets-Sheet 1

Inventors
Henry Lyall Ross Smyth
David Mark Makow
Stanley Kenneth Keays
by Stevens, Davis, Miller & Mosher
their attorneys Feb. 20, 1962 H. L. R. SMYTH ET AL 3,022,418

ELECTRONIC CONTROL CIRCUIT

Filed Sept. 25, 1957 5 Sheets-Sheet 2

Inventors
Henry Lyall Ross Smyth
David Mark Makow
Stanley Kenneth Kings
by Stevens, Davis, Miller & Mosher
their attorneys Inventor
Henry Lyall Ross Smyth
David Mark Makin
Stanley Kenneth Keys
by Stevens, Davis, Miller & Mosher
their attorneys Inventors
Henry Lyall Ross Smyth
David Mark Makow
Stanley Kenneth Kings
by Stevens, Davis, Miller & Mosher
their attorneys Feb. 20, 1962 H. L. R. SMYTH ET AL 3,022,418

ELECTRONIC CONTROL CIRCUIT

Filed Sept. 25, 1957 5 Sheets-Sheet 5

United States Patent Office 3,022,418
Patented Feb. 20, 1962

3,022,418
ELECTRONIC CONTROL CIRCUIT
Henry Lyall Ross Smyth, David Mark Makow, and Stanley K. Keays, all of Ottawa, Ontario, Canada, assignors to National Research Council, Ottawa, Ontario, Canada, a body corporate of Canada
Filed Sept. 25, 1957, Ser. No. 686,110
Claims priority, application Canada July 31, 1957
6 Claims. (Cl. 250—17)

This invention relates to a method and means for reducing the power consumption of an electronic circuit and is particularly concerned with mobile electronic units which derive their power from a battery supply.

As a matter of common practice, electronic circuits are always designed so that their power consumption is kept as low as possible, but for certain types of units, mainly those which derive their power from a battery supply, low power consumption becomes of major importance and indeed this feature is vital in that class of electronic devices used for indicating the position of objects in distress such as lost aircraft, sunken ships etc. A mobile transmitter is employed in such a role in the "Crash Position Indicator for Aircraft" invented by Harry Thompson Stevinson and disclosed by him in his Canadian Patent No. 575,533 issued May 12, 1959, and the transmitter disclosed as the preferred embodiment of the present invention has been designed to form part of, and co-operate with, this Stevinson crash position indicator.

In the past efforts have been made to reduce the power consumption of electronic units, chiefly by improved electronic vacuum tube design. Much research has gone into making the present day vacuum tube as efficient as possible so that the required output is delivered with the minimum power input, and the highly efficient thermionic emitter or filament, and the precise, well designed electrode structure, of the modern vacuum tube represent a significant improvement over the earlier models. But there is a limit to which the power consumption can be reduced by these techniques and it would appear that no more material gains can be expected in these vacuum tube techniques.

The significance of the present invention resides in its recognition of the fact that, regardless of their nature, electronic units, whilst operating, invariably have their filaments continuously heated and that the power consumed by the filaments is therefore continuous and approximately constant even though such continuous operation may not be necessary, and that the filaments may be operated intermittently with an attendant reduction in power consumption, with little or no reduction in the practical utility of the unit concerned. This is especially true of those electronic units which use pulse circuits where by the very nature of their employment the vacuum tubes associated with the circuit are only required to operate intermittently. It must be admitted that the filament switching action tends to reduce the life of the vacuum tubes but in many mobile applications, where the unit is powered from a battery, the lowering of tube life-time is of secondary importance when compared with the power savings brought about by the introduction of this filament switching action. This is particularly valid for the crash position indicating equipment mentioned above where any protraction of the useful life of the battery supply associated with the unit, and the concomitant extension in the operating time of the device, may be the means of saving lives.

Intermittent switching of the filaments means, of course, that a switching unit is necessary and the invention would have little virtue if the power consumed by the switching unit was greater than the power saved by its introduction.

A filament pulsing or switching unit whose power consumption is negligible compared with the power saved by its incorporation in the circuit is disclosed in the present specification.

Other benefits in the matter of an electron tube power consumption, in addition to those conferred by filament pulsing, can be realized, when intermittent vacuum tube operation is permissible, by only supplying plate modulating pulses to the tubes as required. A novel circuit has been invented for accomplishing such plate modulation by tuning the output transformer winding of a blocking oscillator so that ringing is produced, and the output of the blocking oscillator then becomes a series of pulse trains spaced at a given recurrence frequency. Transistorizing this circuit still further reduces the power required to effectively plate modulate the tube as well as enabling the circuit to operate from a low voltage battery supply.

As mentioned above the preferred embodiment of the present invention is a transmitter suitable for use with the Stevinson crash position indicator for aircraft and the following description is directed to such a transmitter, though it should be emphasized that this should not be construed as limiting the invention to this one application, and that both the transmitter, and the novel circuits of which it is comprised, may be used elsewhere without departing from the scope and spirit of the present invention.

Throughout the following description reference will be made to the following drawings which serve to illustrate and explain the particular embodiments in which.

Figures 1, 2:
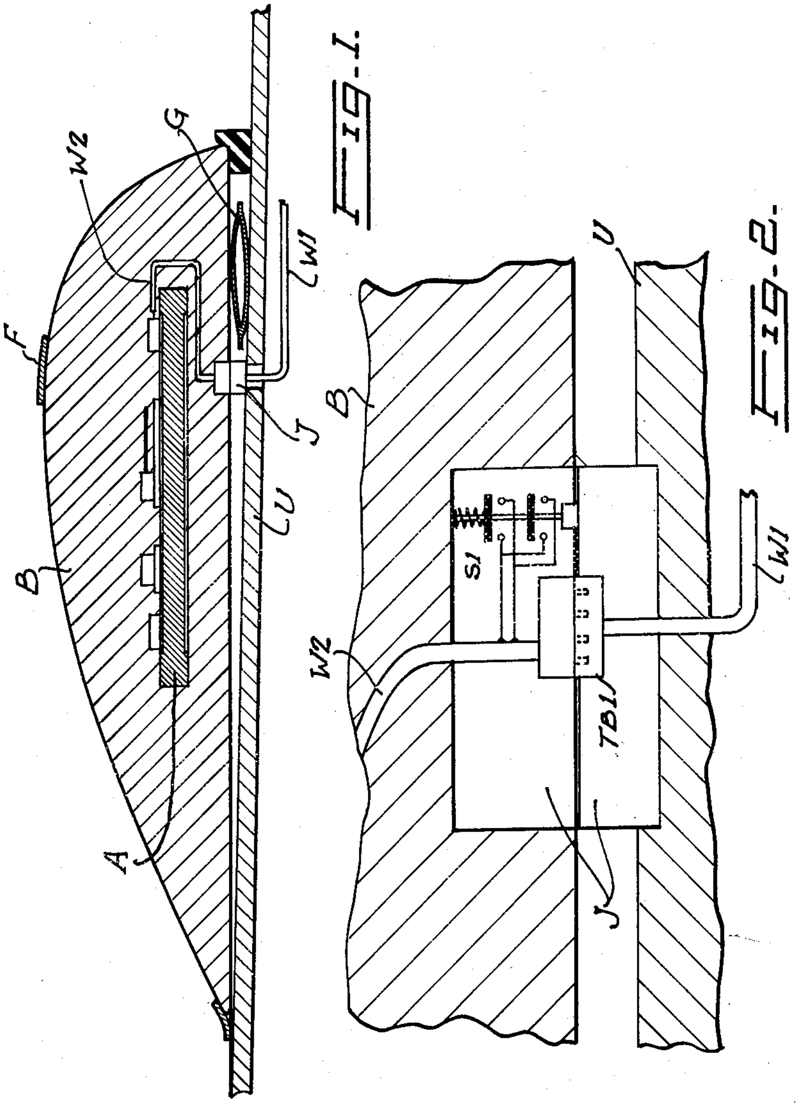
FIGURE 1 is a cross sectional elevation of the crash position indicator.
FIGURE 2 is a detail of the connector block connecting the crash position indicator to the aircraft.

Referring firstly to FIGURE 1 it will be seen that the transmitter, generally denoted by the letter A, forms an integral part of the crash position indicator B which is streamlined into the skin U of the aircraft usually in the empennage. The crash position indicator B is released when the retaining strap F is ruptured which permits the spring G to push the crash position indicator away from the aircraft at the same time breaking the quick release connector block J which is shown in detail in FIGURE 2. This separates the contacts of the connector TB1, disconnecting the transmitter batteries from the aircraft's generators, which had been keeping them in a fully charged condition, and actuating the spring loaded switch S1 which brings the transmitter A into operation. After its release the crash position indicator B rapidly decelerates and comes to rest on the ground or on water in the manner described in the above mentioned Stevinson application.

The crash position indicator B is formed by fabricating two hollow shells, the transmitter is then placed inside, mounted on spacers, and the remaining space inside filled with a resilient compound so that the whole structure becomes as rigid and as shock resistant as possible.

Figure 3:
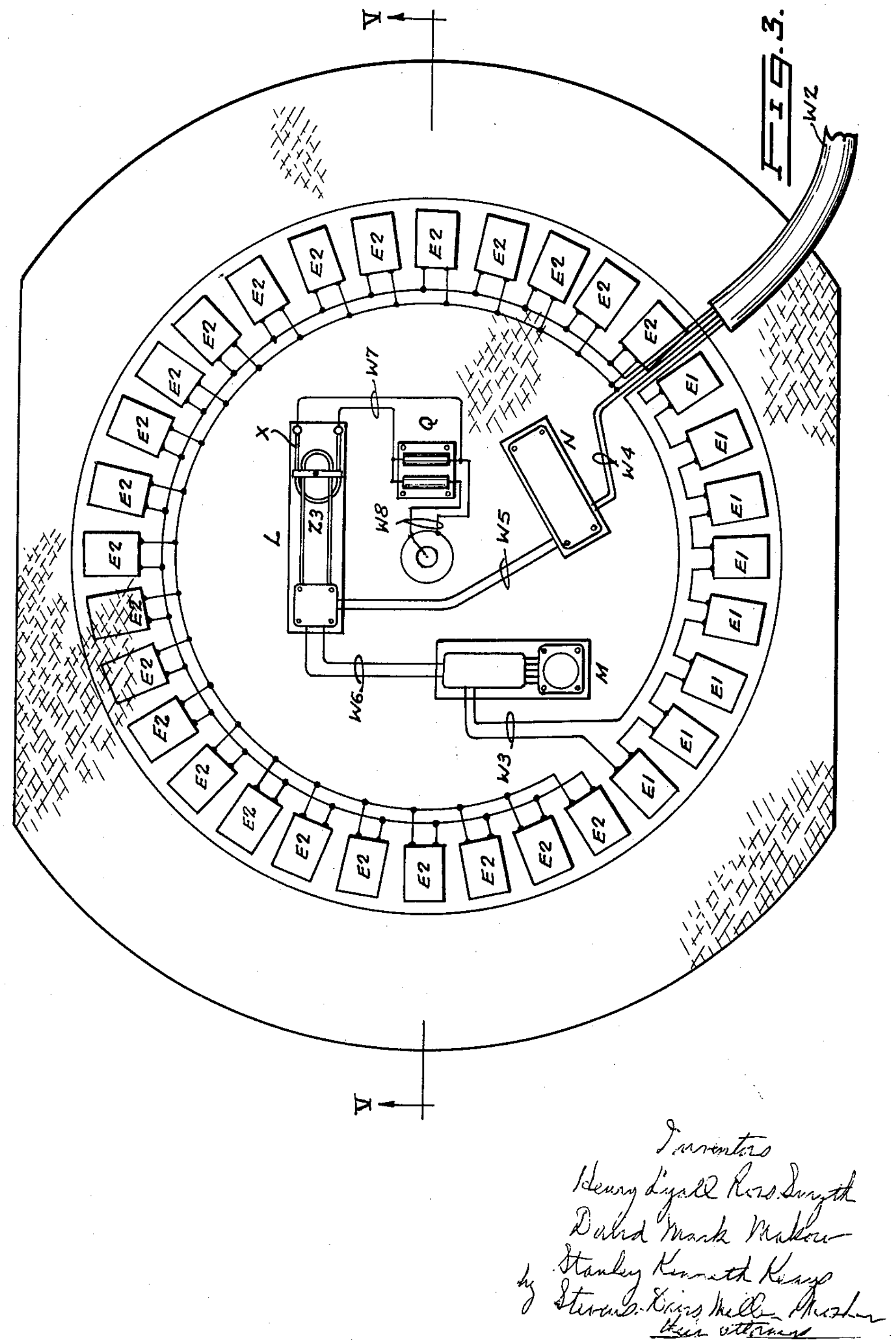
FIGURE 3 is a plan view of the transmitter showing the cabling and the physical layout of the various electronic units.
Figure 4:
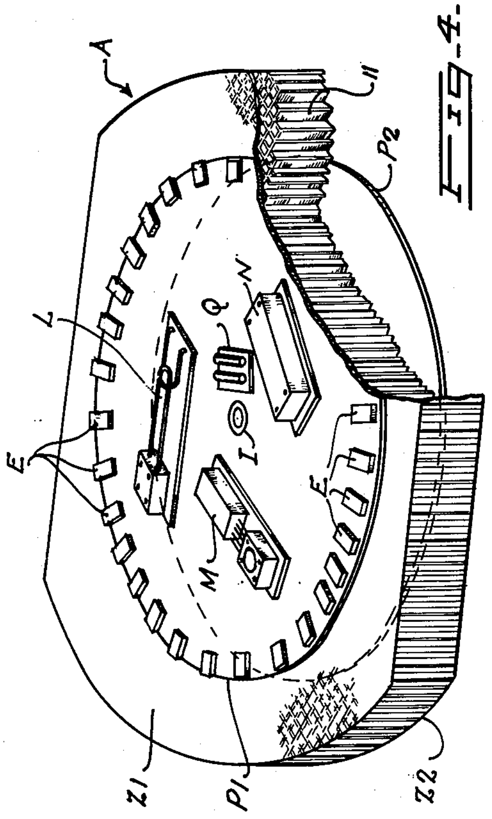
FIGURE 4 is a cut away perspective of the transmitter but with the cabling omitted.
Figure 5:
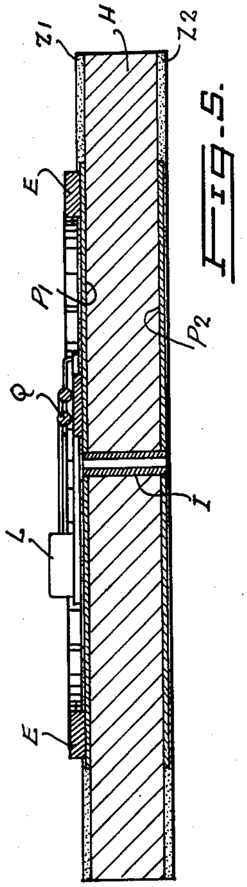
FIGURE 5 is a cross section elevation along the line V—V in FIGURE 3.

The transmitter A is shown in more detail in FIGURES 3, 4, and 5 and consists essentially of a broad, flat base portion on which are mounted a number of electronic units. The base, which is best illustrated in FIGURE 5, consists of a honeycomb section H of the desired thickness which is cut to conform to the shape of the crash position indicator B. Centrally located on either side of this base H are two circular metal plates P1 and P2 which form the antenna of the unit. A hole is drilled through each of these plates and the honeycomb H at the center of the unit, and in this hole is inserted an insulating bushing I so that the center conductor of cable W8 can be fed through the honeycomb to the bottom plate P2. The whole of this base unit is then covered on each side with two plastic sheets Z1 and Z2 which serve to stiffen the base and also to insulate it from the other electronic units which are placed on it.

FIGURES 3 and 4 show these electronic units and how they are disposed on top of the base unit. The battery supply for the transmitter consists of a number of cells E1 and E2 which are disposed symmetrically around the periphery of the upper antenna plate P1. Each of these cells E is a small nickel-cadmium battery of 1.3 volts output, this type of cell being preferred both for its ability to take and hold a charge, and for its good low temperature performance. These cells are wired in series or in parallel as necessary to give the desired operating voltages for the unit with, for example, in the circuit described here, where the plate supply unit for the transmitting tube required approximately 10 volts input and the filament of the transmitting tube required a 1.3 volts supply and approximately 3 times as much filament power is needed as compared with the power required by the plate supply unit, the 32 cells shown being divided in the ratio of 8:24, the eight cells marked E1 being wired in series to give approximately 10 volts output, the remaining 24 cells marked E2 being wired in parallel. The use of these small cells is prefered since it permits a more ready control of the weight distribution throughout the unit which, as will be seen later, forms an important requisite of the transmitter, but of course neither the size nor shape of the batteries is important from an electrical point of view.

These two groups of cells are connected by means of cable W2 to the connector block J and from this block to the aircraft's generators by cable W1. When the spring loaded switch S1 in connector block J is closed upon release of the crash position indicator B, these two groups of cells, E1 and E2, forming the plate and filament supply batteries, are connected by cables W3 and W4 to the plate supply unit M and the filament pulsing unit N respectively. The electronic units of the transmitter are placed inside the ring of battery cells the plate supply unit M being connected by a co-axial cable W6, through which the plate pulses are fed, to the transmitter oscillator L from which in turn another co-axial cable W7 leads the radio frequency output extracted by the pickup loop X to the antenna matching unit Q, and from it via cable W8 to the antenna plates P1 and P2. The filament pulsing is performed by the filament pulsing unit N which is connected, by coaxial cable W4, to the transmitter L.

The physical layout of these various units is important from the point of view of the successful aerodynamic operation of the crash position indicator as a whole, and the various units are suitably placed on the base so that their weight distribution permits the crash position indicator to function in the manner disclosed by Stevinson. Since it is desirable that the transmitting unit operate equally well with either plate P1 or P2 uppermost one important condition of the weight distribution is that the crash position indicator when floating in water either way up will have the antenna plates P1 and P2 parallel to and the same corresponding distances from the surface of the water, so that no matter which way up the device is floating the vertical and horizontal coverage diagrams of the antenna remain essentially the same.

Figure 6:
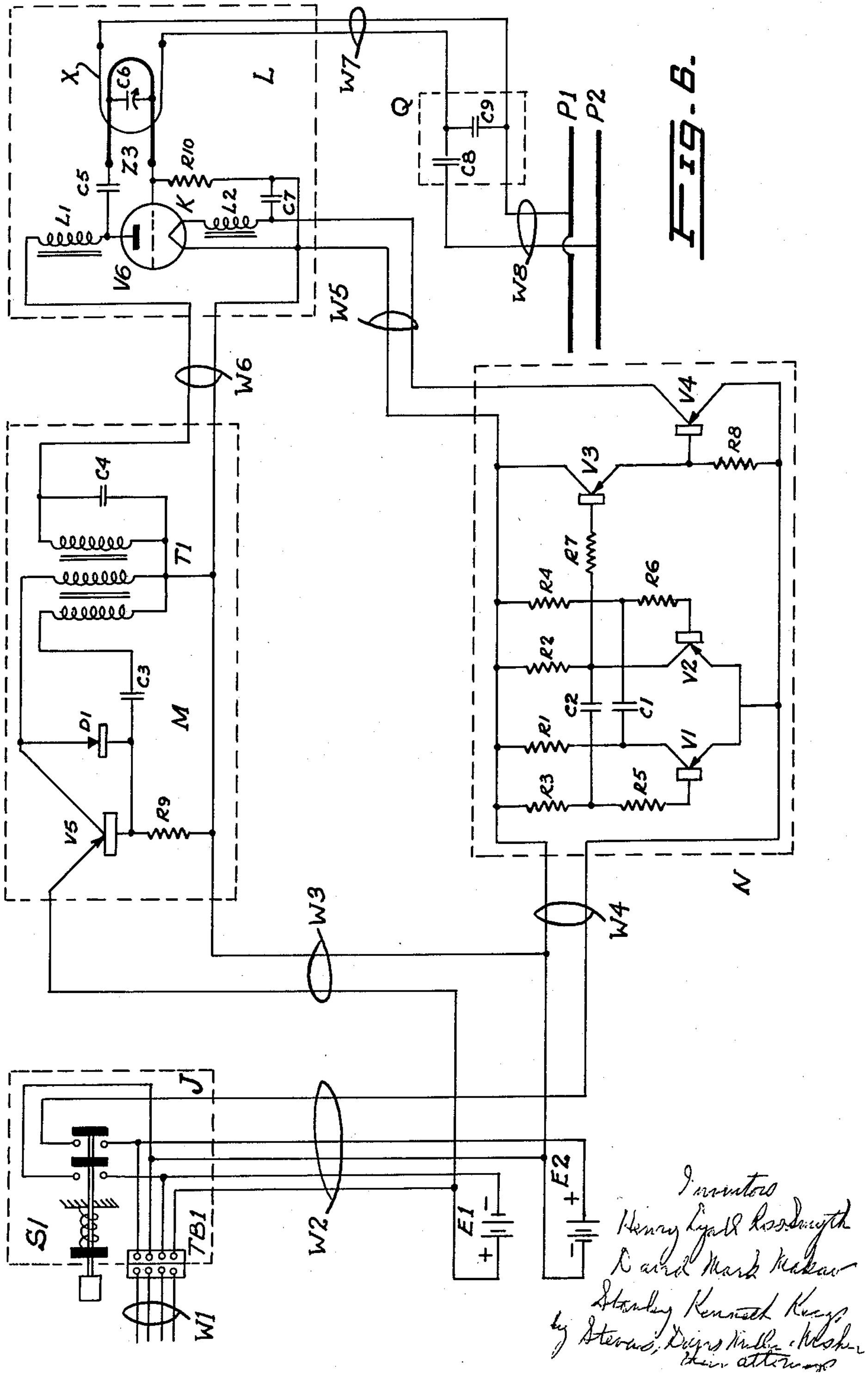
FIGURE 6 is the schematic diagram of the transmitter.

FIGURE 6 shows the schematic diagram of the transmitter with the various electronic units mentioned above being shown within the dotted lines on this diagram.

The transmitter is set off, in the manner described above, by the release of the crash position indicator from the aircraft. This disconnects connector block J, opening connector TB1 and closing the contacts of this spring loaded switch S1. Opening TB1 and closing S1 has the combined effect of disconnecting the batteries E1 and E2 from the aircraft's generators, and of connecting them instead to the plate supply unit M and the filament pulsing unit N respectively, setting these two units in operation.

Considering firstly the filament pulsing unit N it is the function of this unit to make and break the filament supply current from the battery to the emitter of the vacuum tube oscillator V6, and as such may be most broadly defined as a switching mechanism. Though any switching device would do which automatically intermittently makes and breaks the circuit, with the simplest perhaps being a bimetallic strip which heats up and bends away then after cooling returns to close the circuit, in the transmitter described here it is preferable to have a more precise control of the switching action and the switching is controlled by pulse generator. Since unequal make and break periods are required and the pulses must be sharp, the pulse generator used was chosen from that group known as relaxation oscillators, whose output is of this nature, with a simple transistor multivibrator giving excellent results. The output from this relaxation oscillator is applied to a regulating device which controls the flow of current to the filament, this regulating device provides the actual switching action, and the simplest method of controlling switching, namely by use of a relay immediately suggests itself, but relays are subject to shock and it was decided instead to use a switching transistor, as combining the required qualities of small size, reliability and shock resistance.

The filament pulsing unit used is shown in FIGURE 6 and it will be seen that this consists of a multi-vibrator section formed by resistors R1, R2, R3, R4, R5 and R6, capacitors C1 and C2 and transistors V1 and V2, an impedance matching section, which consists of resistors R7 and R8 and a transistor V3, and a switching transistor V4. The multi-vibrator section is a conventional plate to grid coupled, astable or "free running," multivibrator with the normal triode vacuum tubes replaced by transistors. The operation of this circuit is practically identical with that employing tubes instead of transistors and may be most readily understood if each of the transistors is replaced for analogy purposes with a triode, considering the plate of the triode as being the collector of the transistor, the grid of the triode as the base of the transistor, and the cathode of the triode as the emitter of the transistor. With this substitution the operation of the circuit becomes quite straight forward and a description of its operation may be found in any of the standard works of reference on relaxation oscillators including volume 19 of the Massachusetts Institute of Technology Radiation Laboratory Series. The transistors shown here are p-n-p junction transistors of the voltage amplifier type whose operation while analogous to that of the triode mentioned above, achieves the necessary phase reversal in the opposite sense, in that a negative pulse arriving at the base of such a transistor causes it to conduct more heavily, and a positive pulse causes it to become cut-off, with, of course, a corresponding reversal in the collector potentials in that when the transistor conducts more heavily the collector potential rises (since the emitter is positive with respect to the collector), and conversely cutting-off the transistor causes the collector potential to drop.

The multi-vibrator, as mentioned previously, is astable or "free running" and is so designed that its output is unsymmetrical with the negative going portion of the pulse cycle being much shorter than the positive going portion. The negative going pulse controls the time the filament of the transmitter oscillator tube is on, and the positive going pulse controls the time that the filament is off. As will be shown later, during the description of the operation of the triode oscillator, typical values are that the filament be on for approximately .3 second and off for approximately 1.8 seconds. Using 2N130 transistors it was found that these values of on and off time could be obtained when R1=R2=3.3KΩ, R3=R4=33KΩ and R5=R6=1KΩ with the required unsymmetrical operation being introduced by different values of the two capacitors C1 and C2 which were made equal to 30 microfarads and 200 microfarads respectively.

The negative going pulses are taken from the collector of transistor V2 via the blocking resistor R7 (120 ohm) to the base of transistor V3. This transistor, which is connected in what is known as the ground collector configuration, is analogous to the cathode follower circuit in vacuum tube techniques, and is used as an impedance matching device, since a transistor so connected has a high impedance from the base to the emitter, and a low impedance from the emitter to the collector. The output from transistor V3 which is a voltage transistor of the 2N130 type is taken across the resistor load R8 in the emitter circuit of this transistor, for which a value of 1KΩ was found to be most suitable, the low impedance negative going pulse appearing across R8 then being fed to the base of the switching transistor V4. The appearance of this negative pulse at the base of this transistor, which is of the 355 type, causes this transistor to switch over from its previous cut-off state to a heavily conducting state and thus current from the E2, 1.3 volt battery supply is fed via cable W5 to the filament of tube V6, the triode oscillator, during the time that the negative going pulse is appearing on the base of the V4.

Considering now the plate supply unit M which provides the plate voltage for the triode oscillator tube V6, the output of this unit, as will be seen later, must consist of pairs of pulses, of a definite width and amplitude, spaced a known distance apart, with the pulse pairs occurring automatically at a given recurrence frequency. Conventional circuits are available to perform this function, but all proved too bulky and needed too high a battery supply, when what was needed here was a compact, reliable, shock resistant unit which could give high voltage amplitude peak pulses from the low D.C. source available. The circuit disclosed with this specification shows a novel means of meeting this requirement, and contains only six small component parts, a transistor V5, a blocking oscillator transformer T1, whose three windings have one side connected in common to the negative supply to the unit, the other end of the primary winding being connected via a capacitor C3 to the base of the transistor, and then via resistor R9 to the negative supply voltage line, the other end of the secondary winding being joined to the collector of the transistor, a protective crystal diode D1 connecting the collector to the base of the transistor so that a low impedance path is provided for current flowing from the collector to the base, and the other end of the tertiary, or output, winding across which is connected capacitor C4, providing, together with the common negative D.C. line, the output terminals for for the circuit, the positive supply lead for the unit being fed to the emitter of transistor V5.

Examination of this circuit shows that it is a normal blocking oscillator circuit except for the capacitor C4 across the output winding whose effect will be described later. The triode vacuum tube analogy may again be usefully employed for this circuit with, as before, the emitter being considered as the cathode, the collector as the plate, and the base as the grid of the triode vacuum tube. With such a substitution the circuit becomes completely conventional though it should be remembered that, as this is a p-n-p junction transistor, the voltages are reversed the emitter (cathode) being positive with respect to the collector (plate). The CR constant in this circuit is provided by the capacitor C3 in series with the resistor R9 and these control the frequency with which the blocking oscillator pulses. The crystal diode D1 is used in a manner common throughout transistor circuitry to prevent the reverse current swing present in blocking oscillator devices from damaging the transistor by providing an alternative low resistance path for such current swings.

Since it is required that this plate supply circuit have a low power consumption also, the pulse recurrence frequency of the circuit is kept quite low, at about 50 cycles per second and using a 355 switching transistor as V5 and a IN38 diode as D1 it was necessary to employ values of R9 and C3 of 100KΩ and 16 microfarads respectively to obtain this pulse recurrence frequency. The transformer T1 through it has the conventional 1:1 ratio of the primary to secondary winding, has a high step up ratio of approximately 20:1 for the tertiary winding and this enables pulses of 400 peak volts amplitude to be obtained from the blocking oscillator circuit.

The effect of introducing capacitor C4 across the output winding of T1 is an important one and it causes the output circuit to "ring" so that, instead of the unique pulse normally obtained from such blocking oscillator circuits, there are two or more pulses present in this output circuit.

This ringing is caused by the connection of a capacitive reactance element into the winding, and since all the windings are inductively coupled, the same effect could be obtained by introducing the capacitor into either of the other two windings, and similarly the capacitor could be connected in series or in parallel with any of the windings, or even, with certain transformers, it could simply be the inter-winding capacitance. The basic requirement is that a capacitor, in some form or other, be connected to one of the windings, so that "ringing" is produced.

Figure 7:
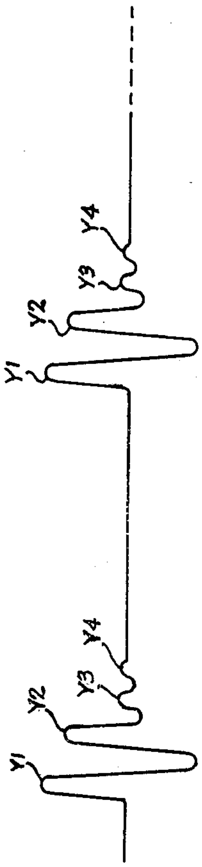
FIGURE 7 shows the pulse waveforms from the plate supply unit.

The pulses are rapidly damped due to the action of the blocking oscillator circuit, and it has been found that by suitably selecting a value of C4 it is possible to obtain from the circuit a pulse waveform as shown in FIGURE 7 having only two pulses $Y_1$ and $Y_2$ of appreciable amplitude followed by two minor very damped oscillations $Y_3$ and $Y_4$. The value of C4 also exerts a considerable influence on the width of these pulses, and, with a value of C4 of 40 micromicrofarads, the output of the plate supply circuit consists of a series of pulse pairs each pulse being 80 microseconds long and spaced 80 microseconds apart, at a basic pulse recurrence frequency of 50 cycles per second, that is to say the pulse pairs were spaced .02 second apart, their amplitude being, as previously mentioned, 400 volts peak.

The transmitter oscillator section L produces the radio frequency output of the transmitter, and takes the form most suited to the frequency to be radiated, which in this case is in the VHF band, and accordingly the oscillator section consists of a triode vacuum tube V6, between whose plate and grid is connected a parallel line tuned circuit Z3, the plate connecting lead having in it a blocking capacitor C5. Plate pulses are fed from the plate supply unit M via cable W6 and applied to the plate via RF choke L1, the common negative D.C. line being connected to one side of the directly heated cathode K, to the other side of which is connected the positive lead coming from the filament pulsing unit N via cable W5, filament current pulses being applied through the RF choke L2, with the negative lead being joined to the common negative D.C. line. A by-pass capacitor C7 is connected across the positive and negative leads of cable W5, and grid resistor R10 goes from the grid of V6 to the negative line. A small trimming capacitor C6 is placed across the end of the parallel line tuned circuit.

The triode oscillator V6 is thus supplied with filament pulses from the filament switching unit, and plate pulses consisting of spaced pairs of pulses which are fed to the plate from the plate supply unit, as shown in FIGURE 6, with the RF chokes L1 and L2 being introduced into each of these pulse leads to isolate the radio frequency oscillations associated with the oscillator triode from the two pulsing circuits. The triode oscillator is a conventional parallel line triode VHF oscillator, plate modulated, which has a natural oscillation frequency in the VHF band (30 to 300 mcs.) the capacitor C5 being introduced to block the high voltage present in the plate circuit from the parallel line Z3 and resistor R10 being the grid by-pass resistor. The tube has a directly heated cathode K and the radio frequency by-pass, necessary with such arrangement, is provided by C7. The values of C5 and R10 may be varied over quite a broad range though care must be exercised in that if they become too large the oscillator has a tendency to commence squegging (i.e. to burst into self oscillation), the decoupling capacitor C7 having a value conventional in these applications of .001 microfarad. Fine control of the transmitter frequency is provided by the trimming capacitor C6 and it is generally arranged that the triode oscillator operate at approximately 240 megacycles.

Considering now the manner of operation of the oscillator it will be remembered that pulse pairs are arriving at the plate of the triode every .02 second, and filament pulse arrives and heats up the filament of the tube approximately every 2 seconds lasting for about .3 of a second. The arrival of the filament pulse causes the directly heated cathode K of the tube to heat up and electrons are then emitted by the filament. There is, however, a certain thermal time delay attendant upon this heating operation and the filament pulse must last long enough for the required operating temperature to be reached, or in other words, sufficient electrons must boil off the filament to enable the tube to oscillate. This time is dependent on both the characteristics of the tube and the value of the plate voltage since a higher plate voltage will cause the oscillation to commence earlier. Once the filament has heated sufficiently the tube will oscillate whenever a pulse pair appears at the plate of the triode and an examination will show that during a .3 second period approximately 15 pulse pairs will arrive at the plate, and cause corresponding oscillations of the triode oscillator.

The off time of the filament is important since if it is made too short then the filament of the tube does not have time to cool sufficiently, and, after a prolonged number of on and off cycles, there is a noticeable creeping effect, in that there is a cumulative, overall, residual heat present in the filament and this causes the oscillation to build up much more rapidly when the next filament pulse arrives, or indeed may reach the point where the oscillation is sustained even though the filament is intermittently switched off. On the other hand if the off period is made too great, even though extending the off period is desirable since it reduces the power drain of the circuit, the number of oscillations transmitted by the device in any given period of time becomes too low and there is considerable danger that the transmissions from the crash position indicator will not be noticed by the observer in the searching aircraft especially if the aircraft is travelling at high speed. Hence a comprise is reached and a ratio of off to on time of 6:1 has been found acceptable for average speed aircraft so that with a 0.3 second on time as stated previously, a suitable value of the off period is approximately 1.8 seconds.

It should be pointed out here that one most important and most beneficial effects of the off period, in addition to the direct saving of power resulting from switching off the filament during this period, is that it permits the filament battery E2 to recuperate to some extent and this in turn has the effect of increasing the life time of the battery since batteries undergoing a continuous and sustained drain fail more rapidly than those which are operated intermittently, even though the total overall time of operation is the same in each case.

The oscillations are extracted by means of the pick up loop X shown, and are then fed via cable W7 to the antenna matching unit Q which consists of two trimming capacitors C8 and C9, in series and parallel with the antenna plates P1 and P2, the effect of these trimming capacitors being to match the antenna plate system to the pick up loop, and to tune the antenna to the oscillator frequency.

From the antenna matching unit the oscillator pulses are fed by means of cable W8 to the antenna plates P1 and P2. Capacitive antenna of the type shown here are standard in the art and it is not proposed to enter into any detailed description of their method of operation here. If desired, reference may be had to chapter 17, section 5 of Schelkunoff and Friis Book entitled "Antennas—Theory and Practice."

The pulses are radiated in an omni directional horizontal pattern from the antenna and, with the circuit arrangements outlined in the foregoing description where the peak power of the radiation pulses is approximately 5 to 8 watts, the useful range of the device may go as high as 70 miles under good propagation conditions. The pulse pairs when they reach a searching aircraft are received by a directional antenna which indicates the bearing of the crash position indicator transmitter from the aircraft on an oscilloscope, the first pulse of the pulse pair being used to trigger the time base of the oscilloscope and the second pulse being used to obtain a relative bearing of the transmitter.

Though the above circuit is preferred for the crash position indicator transmitter because of its simplicity, reliability, power economy and ability to withstand shock, alternative embodiments readily suggest themselves and it is pertinent to consider some of them here, so that the true scope of the invention may be fully appreciated.

Figure 8:
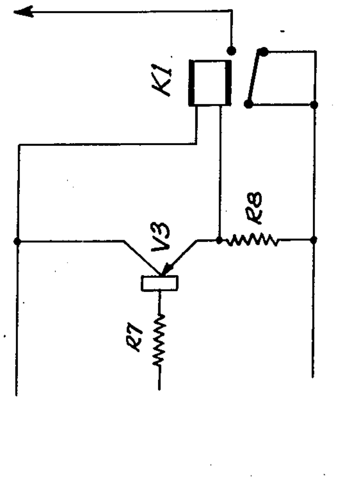
FIGURE 8 is a circuit modification to permit the use of a relay.

The switching transistor V4 in the filament pulsing unit could be readily replaced with any regulating device controlled by the pulse from the multi-vibrator such as a relay connected in the manner shown for relay K1 in FIGURE 8, so that the arrival of the pulse from the impedance matching transistor V3 will cause the relay coil to energize thus closing the contacts and supplying filament power to the triode oscillator. This connection would be used when the relay is of the low impedance variety but a high impedance relay could be connected directly to the collector of transistor V2. This relay method of operation suffers from lack of ability to withstand shock and for this reason would be unsuitable for the crash position indicator transmitter, though it could be used to advantage in other applications of the filament pulsing technique.

Figure 9:
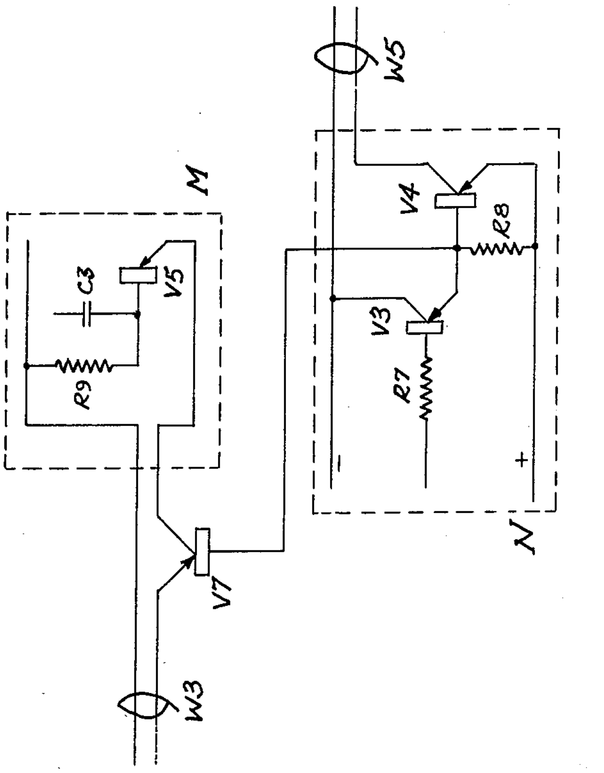
FIGURE 9 illustrates how the plate supply unit may be controlled by the filament pulsing unit.

In the crash position indicator as described above the plate pulsing and the filament pulsing actions take place independently and for this reason the above embodiment illustrates perhaps most accurately the independent yet co-operative nature of these two techniques, but, if desired, the two actions could be synchronized by having the filament pulsing unit switch off the power supply to the plate supply unit in the manner shown in FIGURE 9 where the negative pulse appearing across resistor R8 in addition to being applied to the base of switching transistor V4 is fed to the base of a similar switching transistor V7 which is inserted in the negative D.C. supply line to the plate supply unit M, with its emitter connected to the battery side of the line and its collector to the plate supply unit side of the line.

One modification having considerable merit from the point of view of power economy, but which has not been included here because of its attendant drawback of increased complexity and hence increased unreliability, is that of transforming the crash position indicator unit into a full beacon system by the incorporation in the unit of a receiver. With such a receiver unit, which again could be transistorized to minimize power drain, the transmitter would remain inoperative until exploratory pulses were received from searching aircraft. This pulse or pulses, after passing through the receiver, would activate both the filament pulsing unit and the plate supply unit and cause the transmitter associated with the crash position indicator to transmit a reply to the searching aircraft. This would have the additional benefit of enabling range information to be derived from the unit as well as the purely bearing information at present obtained from the device.

Though the primary benefit derived from filament pulsing is in the field of power economy it is also useful as a method of controlling the output of a vacuum tube, and, by suitable control of the filament pulses, the output pulses from the transmitter in the above embodiment could be utilized so as to transmit intelligence, for example in the form of coded pulses from the transmitter, such coding either being done automatically by a coding unit, or alternatively by a manual keying operation which could be carried out by a survivor of the crash.

The embodiments of the invention in which an exclusive property or privilege is claimed are defined as follows:

1. A mobile radio frequency transmitter comprising, in combination, a low voltage direct current battery power supply; a vacuum tube radio frequency oscillator connected to said battery; a plate supply unit connected to said battery and to said radio frequency oscillator and effective to plate modulate said radio frequency oscillator, said plate supply unit comprising a blocking oscillator including a blocking oscillator transformer having a primary winding, a secondary winding and a tertiary winding, said primary to said secondary winding ratio being substantially 1:1, and said tertiary to said secondary winding ratio being at least 10:1, and a ringing capacitor connected across said tertiary winding whereby the output waveform of said plate supply unit taken across said tertiary winding comprises a series of pulse trains spaced at a given recurrence frequency; and an antenna system adapted for extracting radio frequency energy pulses from said vacuum tube radio frequency oscillator and for radiating said radio frequency energy pulses.

2. A mobile radio frequency transmitter as defined in claim 1 wherein said antenna system comprises a pick up loop for extracting said radio frequency energy pulses, a parallel plate capactive antenna, and an antenna matching unit connected to said pick up loop and to said capacitive antenna.

3. A mobile radio frequency transmitter as defined in claim 1 wherein said vacuum tube radio frequency oscillator comprises a parallel line triode oscillator oscillating in the very high frequency band.

4. A mobile radio frequency transmitter comprising, in combination, a low voltage direct current battery power supply; a vacuum tube radio frequency oscillator connected to said battery; a plate supply unit connected to said battery and to said radio frequency oscillator and effective to plate modulate said radio frequency oscillator, said plate supply unit comprising a transistor blocking oscillator, said transistor blocking oscillator comprising a transistor, having a base, a collector and an emitter, said emitter being connected to one pole of said source, a blocking oscillator transformer, having a primary, a secondary and a tertiary winding, the ratio of said primary to said secondary winding being substantially 1:1 and the ratio of said tertiary winding to said secondary winding being at least 10:1, one end of each of said windings being connected together and to the other pole of said source, the other end of said secondary winding being connected to said collector, a base resistor connected to said base and to said other pole of said source, a base capacitor connected to said base and to the other end of said primary winding, and a protective diode connected across said base and said collector effective to provide a low impedance path for current flowing from said collector to said base; and a ringing capacitor connected across said tertiary winding whereby the output waveform of said circuit taken across said tertiary winding comprises a series of pulse trains spaced at a given recurrence frequency; and an antenna system adapted for extracting radio frequency energy pulses from said vacuum tube radio frequency oscillator and for radiating said radio frequency energy pulses.

5. A mobile radio frequency transmitter comprising, in combination, a low voltage direct current battery power supply; a vacuum tube radio frequency oscillator, the vacuum tube of said radio frequency oscillator including a plate and an electrically energised emitter; a filament pulsing unit, said filament pulsing unit comprising an astable transistor multivibrator, and a switching transistor, controlled by the output of said multivibrator connected to said battery and said emitter whereby recurrently to connect said battery to said emitter; a plate supply unit connected to said battery and said plate of said vacuum tube, said plate supply unit comprising a blocking oscillator, including a blocking oscillator transformer having a primary winding, a secondary winding, and a tertiary winding, said primary to secondary winding ratio being substantially 1:1 and the ratio of said tertiary winding to said secondary winding being at least 10:1, and a ringing capacitor connected across said tertiary winding whereby the output waveform of said plate supply unit taken across said tertiary winding comprises a series of pulse trains spaced at a given recurrence frequency; and an antenna system adapted for extracting radio frequency energy pulses from said vacuum tube radio frequency oscillator and for radiating said radio frequency energy pulses.

6. A mobile radio frequency transmitter comprising, in combination, a low voltage direct current battery power supply; a vacuum tube radio frequency oscillator, the vacuum tube of said radio frequency oscillator including a plate and an electrically energised emitter; a filament pulsing unit, said filament pulsing unit comprising an astable transistor multivibrator, and a switching transistor controlled by the output of said multivibrator, connected to said battery and said emitter whereby recurrently to connect said battery to said emitter; a plate supply unit connected to said battery and to said radio frequency oscillator and effective to plate modulate said radio frequency oscillator, said plate supply unit comprising a transistor blocking oscillator, said transistor blocking oscillator comprising a transistor, having a base, a collector and an emitter, said emitter being connected to one pole of said source, a blocking oscillator transformer, having a primary, a secondary and a tertiary winding, the ratio of said primary to said secondary winding being substantially 1:1 and the ratio of said tertiary winding to said secondary winding being at least 10:1, one end of each of said windings being connected together and to the other pole of said source, the other end of said secondary winding being connected to said collector, a base resistor connected to said base and to said other pole of said source, a base capacitor connected to said base and to the other end of said primary winding, and a protective diode connected across said base and said collector effective to provide a low impedance path for current flowing from said collector to said base; and a ringing capacitor connected to one of said windings whereby the output waveform of said circuit taken across said tertiary winding comprises a series of pulse trains spaced at a given recurrence frequency; and an antenna system adapted for extracting radio frequency energy pulses from said vacuum tube radio frequency oscillator and for radiating said radio frequency energy pulses.

(References on following page)

References Cited in the file of this patent

UNITED STATES PATENTS

| | | |
|---|---|---|
| 2,416,327 | Labin | Feb. 25, 1947 |
| 2,439,816 | Marshall | Apr. 20, 1948 |
| 2,484,209 | Duffy | Oct. 11, 1949 |
| 2,484,229 | Jackson | Oct. 11, 1949 |
| 2,498,689 | Levy et al. | Feb. 28, 1950 |
| 2,555,867 | Bennett | June 5, 1951 |
| 2,558,343 | Crosby | June 26, 1951 |
| 2,565,523 | Russell et al. | Aug. 28, 1951 |
| 2,586,310 | Dill | Feb. 19, 1952 |
| 2,761,971 | Thompson | Sept. 4, 1956 |
| 2,780,767 | Janssen | Feb. 5, 1957 |
| 2,787,712 | Priebe et al. | Apr. 2, 1957 |
| 2,791,739 | Light | May 7, 1957 |
| 2,796,522 | Greenspan et al. | June 18, 1957 |
| 2,810,080 | Trousdale | Oct. 15, 1957 |
| 2,841,700 | Hallden | July 1, 1958 |
| 2,852,676 | Joy | Sept. 16, 1958 |
| 2,884,518 | O'Neill | Apr. 28, 1959 |
| 2,885,550 | Rongen | May 5, 1959 |

FOREIGN PATENTS

| | | |
|---|---|---|
| 688,374 | Great Britain | Mar. 4, 1953 |

OTHER REFERENCES

Publications:

Waveforms by Ridenour, M.I.T. Series, vol. 19, 1949, pages 206–211.

Radio Engineering, Terman, 1947, pages 590–593.

Radio Engineering Handbook, Terman, 1943, page 514.